(12) United States Patent
Huh et al.

(10) Patent No.: US 10,507,716 B2
(45) Date of Patent: Dec. 17, 2019

(54) INTEGRATED CHARGER FOR VEHICLES AND METHOD OF MAKING SAME

(71) Applicant: General Electric Company, Schenectady, NY (US)

(72) Inventors: Kum Kang Huh, Niskayuna, NY (US); Di Pan, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 344 days.

(21) Appl. No.: 15/137,679

(22) Filed: Apr. 25, 2016

(65) Prior Publication Data

US 2017/0305283 A1 Oct. 26, 2017

(51) Int. Cl.
*B60L 1/00* (2006.01)
*B60L 3/00* (2019.01)
(Continued)

(52) U.S. Cl.
CPC .............. *B60K 6/26* (2013.01); *H02P 27/08* (2013.01); *B60Y 2200/92* (2013.01);
(Continued)

(58) Field of Classification Search
CPC .............. B60L 11/1811; B60L 11/1812; B60L 11/1814; B60L 50/50; B60L 53/22;
(Continued)

(56) References Cited

U.S. PATENT DOCUMENTS

| 4,920,475 A | 4/1990 | Rippel |
| 5,341,075 A * | 8/1994 | Cocconi .............. B60L 11/1811 307/66 |

(Continued)

FOREIGN PATENT DOCUMENTS

| EP | 2 875 984 A2 | 5/2015 |
| JP | 05-207664 A | 8/1993 |
| JP | 08-126122 A | 5/1996 |

OTHER PUBLICATIONS

Solero, Luca, "Nonconventional On-Board Charger for Electric Vehicle Propulsion Batteries", IEEE Transactions on Vehicular Technology, vol. 50, No. 1, pp. 144-149, Jan. 2001.
(Continued)

*Primary Examiner* — Rexford N Barnie
*Assistant Examiner* — Rasem Mourad
(74) *Attorney, Agent, or Firm* — Meagher Emanuel Laks Goldberg & Liao, LLP

(57) ABSTRACT

According to some embodiments, a traction system is disclosed. The traction system includes a DC bus, an energy storage device coupled to the DC bus, and a voltage converter assembly coupled to the energy storage device. The voltage converter assembly includes a plurality of phase legs. The traction system further includes an electromechanical device including a plurality of windings coupled to the voltage converter assembly. The traction system also includes a switch coupled to the DC bus between the voltage converter assembly and the energy storage device. The traction system includes a controller configured to control the switch and the voltage converter assembly such that a phase leg and a winding of the electromechanical device form a DC/DC converter.

9 Claims, 4 Drawing Sheets

(51) Int. Cl.
*H02G 3/00* (2006.01)
*B60K 6/26* (2007.10)
*H02P 27/08* (2006.01)

(52) U.S. Cl.
CPC ..... *B60Y 2300/91* (2013.01); *B60Y 2400/604* (2013.01); *B60Y 2400/61* (2013.01); *Y10S 903/906* (2013.01)

(58) Field of Classification Search
CPC ........ B60L 53/20; B60L 53/24; Y02T 90/127; Y02T 90/14; B60Y 2300/91; B60Y 2400/61
See application file for complete search history.

(56) References Cited

U.S. PATENT DOCUMENTS

| | | | |
|---|---|---|---|
| 6,724,100 B1 | 4/2004 | Gabriel | |
| 7,932,699 B2 | 4/2011 | Nam et al. | |
| 8,030,884 B2 | 10/2011 | King et al. | |
| 8,421,271 B2 | 4/2013 | King et al. | |
| 8,441,229 B2 | 5/2013 | Lee et al. | |
| 8,487,582 B2 | 7/2013 | King et al. | |
| 8,872,473 B2 | 10/2014 | Song et al. | |
| 2007/0247123 A1* | 10/2007 | Bocchiola | H02M 3/1584 323/222 |
| 2008/0205109 A1 | 8/2008 | Darroman et al. | |
| 2010/0096926 A1* | 4/2010 | King | B60L 11/123 307/45 |
| 2010/0097031 A1 | 4/2010 | King et al. | |
| 2011/0204854 A1* | 8/2011 | King | H02J 1/10 320/163 |
| 2012/0007552 A1* | 1/2012 | Song | B60L 7/14 320/109 |
| 2012/0013308 A1* | 1/2012 | Briane | H02J 7/02 320/137 |
| 2012/0112702 A1 | 5/2012 | Steigerwald et al. | |
| 2012/0153884 A1* | 6/2012 | Lindsey | B60L 53/12 318/500 |
| 2013/0234675 A1 | 9/2013 | King et al. | |
| 2015/0054434 A1* | 2/2015 | Bruyere | B60L 11/1818 318/400.3 |

OTHER PUBLICATIONS

Extended Extended European Search Report and Opinion issued in connection with corresponding EP Application No. 17167717.2 dated Sep. 28, 2017.

* cited by examiner

INTEGRATED CHARGER FOR VEHICLES AND METHOD OF MAKING SAME

BACKGROUND OF THE INVENTION

Embodiments of the present invention relate generally to electric drive systems including hybrid and electric vehicles and to stationary drives that are subject to transient or pulsed loads and, more particularly, to transferring energy between an electrical storage device of the vehicle or drive and a power source external to the vehicle.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Plug-in electric vehicles, whether of the hybrid electric type or of the purely electric type, are configured to use electrical energy from an external source to recharge the traction battery. Such vehicles may include on-road and off-road vehicles, golf cars, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery. Plug-in vehicles may include circuitry and connections to facilitate the recharging of the traction battery from the utility grid or other external source, for example. The battery charging circuitry, however, may include dedicated components such as boost converters, high-frequency filters, choppers, inductors, and other electrical components, including electrical connectors and contactors, dedicated only to transferring energy between the on-board electrical storage device and the external source. These additional dedicated components add extra cost and weight to the vehicle.

The electricity coming into the vehicle for battery charging can be either direct current (DC) or alternating current (AC). DC charging requires a dedicated charging infrastructure and is considered for fast charging. However, it is easier to utilize existing circuitry when AC charging is employed. According to existing IEC/SAE standards, the AC voltage for charging ranges from 120 volts to 600 volts, single-phase or three-phase. The DC link voltage of a rectifier needs to be higher than the peak of the AC voltage to ensure full controllability of the rectifier to meet power factor and harmonic requirements. In most existing hybrid electric vehicles and electric vehicles, the battery voltage can range from 200 volts to 400 volts. Except for 120 volt inputs, a voltage step down stage is required.

Conventional external charger circuits may include a boost (step up) AC/DC converter or a buck (step down) AC/DC converter. However, these converters have a limited output voltage restricting the ability to control charging the battery. For instance, with 120 volt or 240 volt AC input, the DC output voltage cannot be lower than 170 volt or 340 volt respectively when boost AC/DC converters are used. Furthermore, with 120 volt or 240 volt AC input, the DC output voltage cannot be higher than 170 volt or 340 volt when buck AC/DC converters are used. A DC/DC converter can be included to match the full battery voltage range; however, this leads to increasingly large chargers to compensate for growing power levels, which is ultimately difficult to package into a vehicle.

An example of a conventional external charger circuit is described in U.S. Pat. No. 8,030,884, which is herein incorporated by reference. In the configuration in FIG. 1 of this patent, the output of a diode rectifier is coupled to a DC link of a traction inventor through a plurality of inductors. This configuration is only capable of boosting (not bucking) the output voltage of a diode rectifier determined by an external AC voltage source, limiting charging capabilities. Further, contactors utilized in this configuration need to be sized for operating the current of an electric motor, which can be significantly larger than the charging current, leading to heavier and more expensive contactors.

It would therefore be desirable to provide an apparatus to facilitate the transfer of electrical energy from an external source to the on-board electrical storage device of a plug-in vehicle for all charging conditions that reduces the cost and number of components dedicated only to transferring energy between the on-board electrical storage device and the external source.

SUMMARY OF THE INVENTION

According to some embodiments, a traction system is disclosed. The traction system includes a DC bus, an energy storage device coupled to the DC bus, and a voltage converter assembly coupled to the energy storage device. The voltage converter assembly includes a plurality of phase legs. The traction system further includes an electromechanical device including a plurality of windings coupled to the voltage converter assembly. The traction system also includes a switch coupled to the DC bus between the voltage converter assembly and the energy storage device. The traction system includes a controller configured to control the switch and the voltage converter assembly such that a phase leg and a winding of the electromechanical device form a DC/DC converter.

According to some embodiments, a method for charging a hybrid electric vehicle is disclosed. The method includes configuring a controller to close a first switch on a DC bus coupled between an electromechanical device and an energy storage device, open a second switch on the DC bus coupled between a voltage converter assembly and the energy storage device, and turn on a phase leg of the voltage converter assembly such that the phase leg and a winding of the electromechanical device form a DC/DC converter.

According to some embodiments, a traction system is disclosed. The traction system includes a DC bus, an energy storage device coupled to the DC bus, a first voltage converter assembly coupled to the energy storage device, and a second voltage converter assembly coupled to the energy storage device. The first voltage converter assembly includes a first plurality of phase legs and the second voltage converter assembly includes a second plurality of phase legs. The traction system further includes a first electromechanical device, including a plurality of windings, coupled to the respective phase legs of the first voltage converter assembly, and a second electromechanical device, including a plurality of windings, coupled to the respective phase legs of the second voltage converter assembly. The traction system also includes a first switch coupled to the DC bus between the first electromechanical device and the energy storage device, and a second switch coupled to the DC bus between the second electromechanical device and the energy storage device. The traction system includes a controller configured to control the first and second switches and the voltage converter assemblies such that a phase leg of the first voltage converter assembly and a winding of the first electromechanical device form a first DC/DC converter, and a phase leg of the second voltage converter assembly and a winding of the second electromechanical device form a second DC/DC converter.

The above embodiments enable rapid charging of the vehicle without the addition of any significant on board charger components. Further, the windings of the electromechanical device may remain connected to the voltage converter assembly during charging, leading to lower cost and greater efficiency. Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not, therefore, intended to be limiting its scope of the accompanying drawings.

DETAILED DESCRIPTION OF THE INVENTION

Figure 1:
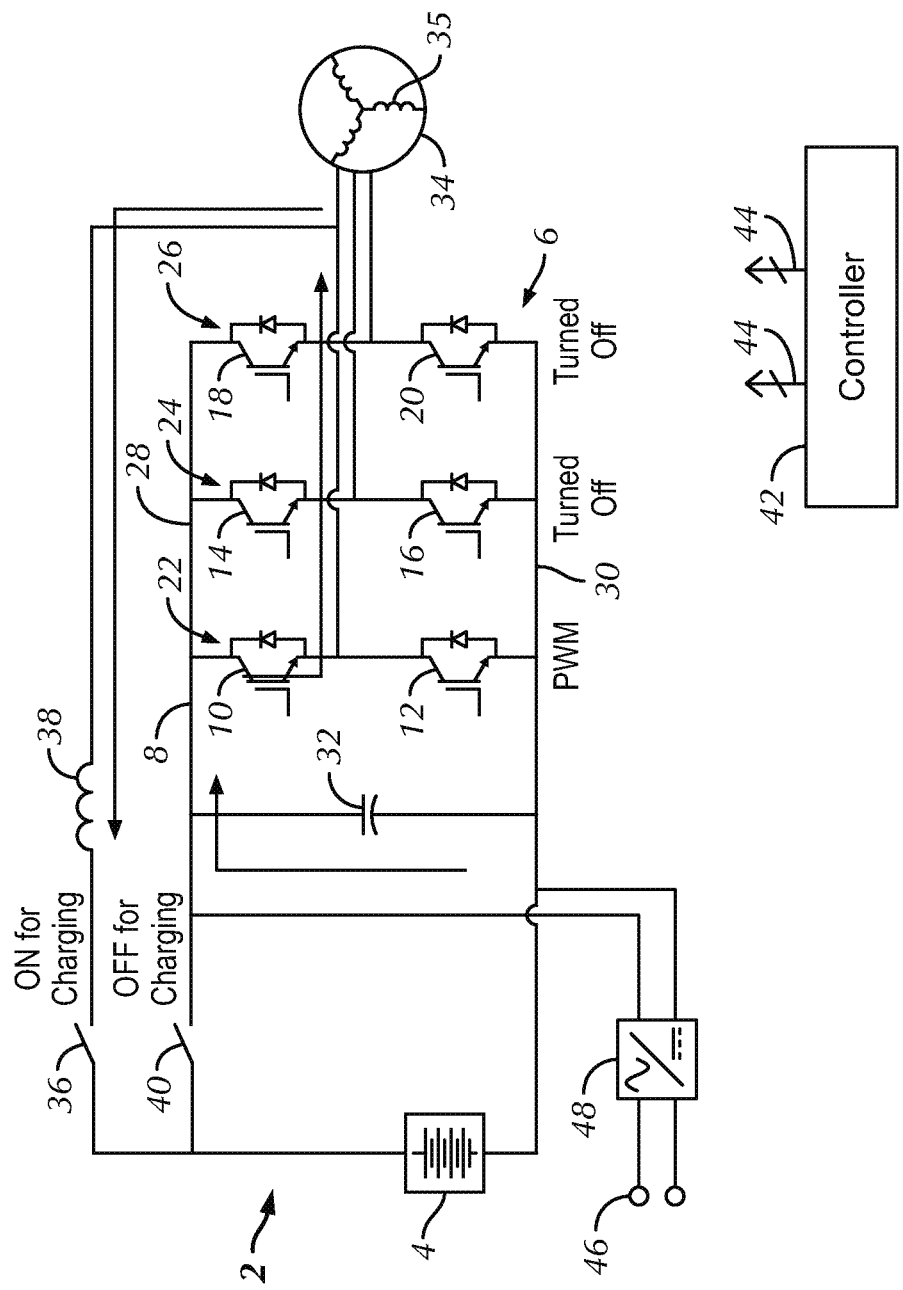
FIG. 1 is a schematic diagram of a traction system according to an embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

FIG. 1 illustrates a schematic diagram of a traction system 2 according to an embodiment of the present invention. Traction system 2 includes an energy storage device 4. In one embodiment, energy storage device 4 may be a battery, a flywheel system, a fuel cell, an ultracapacitor, or a combination of ultracapacitors and batteries, as examples. Energy storage device 4 is coupled to a voltage converter assembly 6 via a DC bus 8. In one embodiment, voltage converter assembly 6 is a bi-directional DC/AC voltage inverter. Voltage converter assembly 6 includes six half phase modules 10-20 that are paired to form three phase legs 22-26. Each module 14-24 comprises a power switch coupled in antiparallel with a diode. Any appropriate electronic switch can be used, such as insulated gate bipolar transistors (IGBTs), metal oxide semiconductor field effect transistors (MOSFETs), silicon carbide (SiC) MOSFETs, gallium nitride (GaN) devices, bipolar junction transistors (NJTs), and metal oxide semiconductor controlled thyristors (MCTs). Each phase leg 22-26 is coupled to a pair of conductors 28 and 30. A DC link capacitor 32 is coupled to the DC bus 8 to provide a smoothing function and filter high frequency currents for DC bus 8.

An electromechanical device 34 is coupled to voltage converter assembly 6. In one embodiment, electromechanical device 34 is a traction motor mechanically coupled to one or more driving wheels or axles (not shown) of a vehicle or other electrical apparatus such as a crane, elevator, or lift, as non-limiting examples. Electromechanical device 34 includes a plurality of windings 35 coupled to the respective phases 22-26 of the voltage converter assembly 6. While shown in a wye configuration, windings 35 could be configured as a delta configuration or any other appropriate configuration. Any number of windings could be used as well.

A first charging switch 36 and an optional inductor 38 are directly coupled between the electromechanical device 34 and energy storage device 4. The optional inductor 38 is included if sufficient inductance is not provided by the electromechanical device 34. A second charging switch 40 is coupled between the energy storage device 4 and the converter assembly 6. Charging switches 36 and 40 may be either mechanical contactors or electronic switches, such as IGBTs, MOSFETs, SiC MOSFETs, GaN devices, NJTs, and MCTs as nonlimiting examples. This configuration is capable of both bucking and boosting voltage from an external charging source, which enables utilizing the full capabilities of stationary charging facilities at all charging conditions as long as the energy storage device 4 can be charged at that speed. Further, charging switches 36 and 40 only need to be sized for charging current, significantly reducing size and cost.

Traction system 2 includes a controller 42 coupled to half phase modules 10-20 and charging switches 36 and 40 via lines 44. Through appropriate control of half phase modules 10-20, controller 42 is configured to control the voltage converter assembly 6 to convert a DC voltage or current on DC bus 8 to an AC voltage or current for supply to the windings 35 of electromechanical device 34. Accordingly, the DC voltage or current from energy storage device 4 may be converted into an AC voltage or current and delivered to the electromechanical device 34 and then to the driving wheels (not shown). In other non-vehicle propulsion systems, the driving wheels (not shown) may be another type of load including a pump, fan, winch, crane, or other motor driven loads. In a regenerative braking mode, electromechanical device 34 may be operated as a generator to brake driving wheels (not shown) and to supply AC voltage or current to voltage converter assembly 6 for inversion into a DC voltage or current onto DC bus 8 that is suitable for recharging the energy storage device 4.

When a vehicle or apparatus incorporating traction system 2 is parked or not in use, it may be desirable to plug the vehicle into, for example, a utility grid or to a renewable energy source to refresh or recharge energy storage device 4.

Accordingly, traction system 2 includes a plug or receptacle 46 configured to mate with an external AC voltage source (not shown). AC voltage source (not shown) may be a high-impedance voltage source having any number of phases. The plug 46 is coupled to a rectifier 48 to convert AC voltage or current from the AC voltage source (not shown) to DC voltage or current such that DC voltage or current can flow through the DC bus 8.

According to one embodiment of the present invention, only one of the phase legs 22-26 is used as a DC/DC converter. As a nonlimiting example, phase leg 22 will be used as the DC/DC converter. The controller 42 turns on phase leg 22 and turns off the remaining phase legs 24-26 so that current does not flow to the electromechanical device 34. Electromechanical device 34 remains connected to converter assembly 6. When charging, first charging switch 36 is closed while second charging switch 40 remains open through use of the controller 42. This allows the phase leg 22 output current to be directed to the energy storage device 4 through first charging switch 36 and inductor 38. The phase leg 22 in combination with closed second charging switch 36 and inductor 38 forms a bi-directional buck/boost DC/DC converter. While this embodiment uses phase leg 22, any phase leg of a converter tied to the DC bus 8 may be used, including phase legs from additional DC/DC converters, traction inverters, or auxiliary inverters.

Using the phase leg 22, first charging switch 36, and inductor 38 as a DC/DC converter enables rapid charging of the energy storage device 4 without the significant addition of on board charger components, thus reducing costs and space required for the DC bus 8. Moreover, the electromechanical device 34 remaining connected to the converter assembly 6 during charging further reduces costs since contactors for the electromechanical device can be expensive. Since only part of the converter assembly 6 is operating, the remainder of the converter assembly 6 is turned off to eliminate unnecessary losses and improve efficiency for low power charging (such as 120 V AC or 240 V AC).

Figure 2:
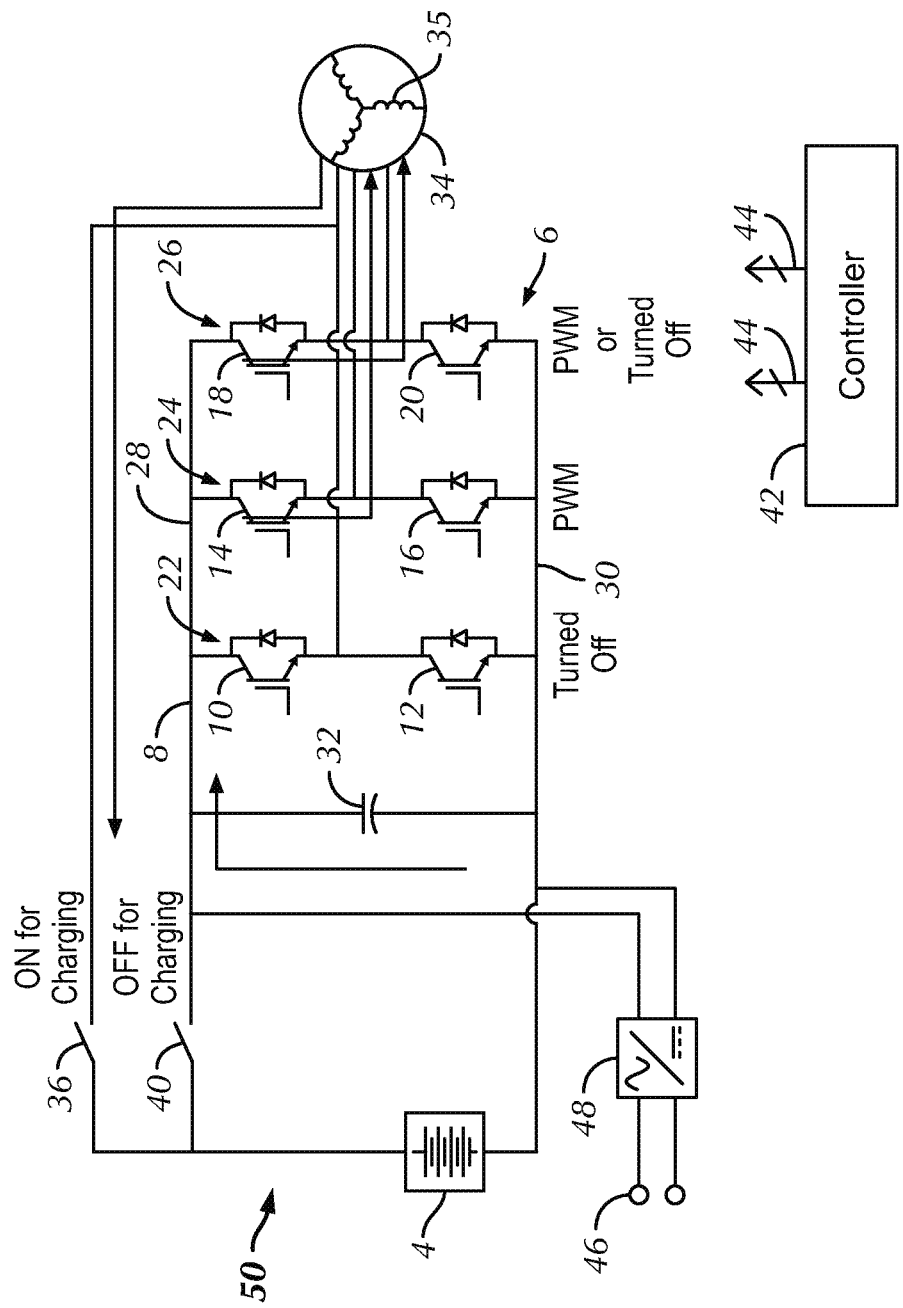
FIG. 2 is a schematic diagram of a traction system according to an embodiment of the present invention.

FIG. 2 is a schematic diagram of a traction system 50 according to another embodiment of the present invention. In this embodiment, all of the phase legs except one may be used for DC/DC conversion. As a nonlimiting example, phase legs 24 and 26 along with windings 35 from electromechanical device 34 will be used for DC/DC conversion. If the windings 35 from electromechanical device 34 do not provide sufficient inductance, inductor 38 may be included. Inactive phase leg 22 is still connected to the energy storage device 4 through first charging switch 36 and optional inductor 38. In this embodiment, the controller 42 turns off phase leg 22 and turns on phase legs 26 and 28. When charging, first charging switch 36 is closed while second charging switch 40 remains open through the controller 42. This allows output current from phase legs 24 and 26 to be directed to the energy storage device 4 through the first charging switch 36 and optional inductor 38. The two active phase legs 24 and 26 in combination with the first charging switch 36 and electromechanical device 34 form a pair of bi-directional buck/boost DC/DC converters. While this embodiment uses phase legs 24 and 26, any phase leg of a converter tied to the DC bus 8 may be used, including phase legs from additional DC/DC converters, traction inverters, or auxiliary inverters.

Using the phase legs 24 and 26, first charging switch 36, and electromechanical device 34 as a DC/DC converters enables rapid charging of the energy storage device 4 without the significant addition of on board charger components, thus reducing costs and space required for the DC bus 8. Moreover, the electromechanical device 34 remaining connected to the converter assembly 6 during charging further reduces costs since contactors for the electromechanical device can be expensive. Additionally, the power level is not limiting due to the use of two active phase legs instead of only one. Where the electromechanical device 34 is a permanent magnet or reluctance motor, torque may be produced, which can attract a rotor to a specific position resulting in slight movement. However, a clutch (not shown) may be included between the motor shaft and the transmission to decouple the motor, eliminating the potential shaft movement.

Figure 3:
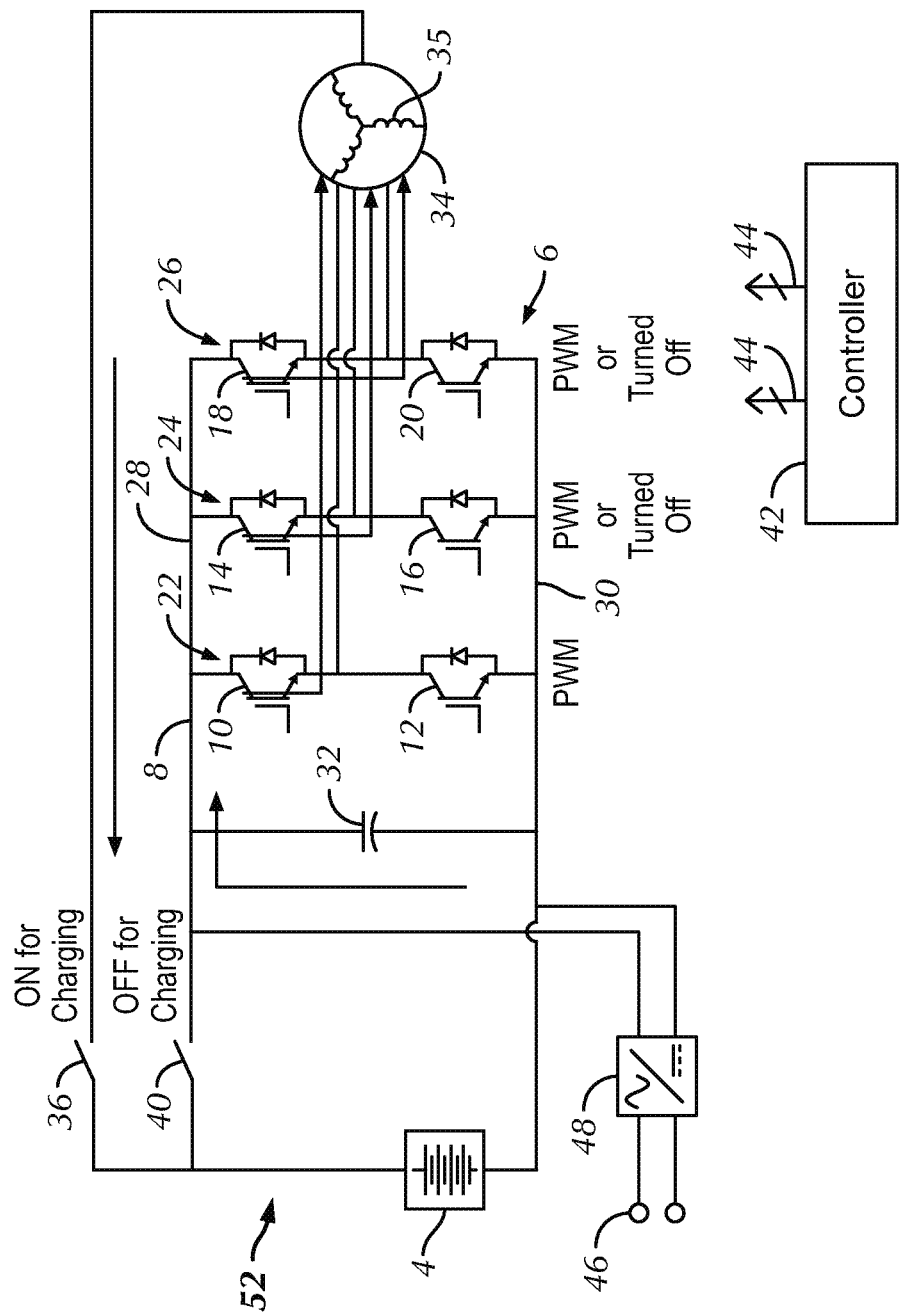
FIG. 3 is a schematic diagram of a traction system according to an embodiment of the present invention.

FIG. 3 is a schematic diagram of a traction system 52 according to yet another embodiment of the present invention. In this embodiment, all of the phase legs 22-26 along with windings 35 from the electromechanical device 34 are used for DC/DC conversion. If the windings 35 from electromechanical device 34 do not provide sufficient inductance, inductor 38 may be included. Electromechanical device 34 is connected to the energy storage device 4 through a first charging switch 36 and optional inductor 38. Electromechanical device 34 includes windings 35 in a star or wye connection. A neutral or center (not shown) is connected to the energy storage device 4 through first charging switch 36 and optional inductor 38. In this embodiment, all three phase legs 22-26 are used. When charging, first charging switch 36 is closed while second charging switch 40 remains open through the controller 42. This allows output current from phase legs 22-26 to be directed to the energy storage device 4 through the electromechanical device 34, first charging switch 36, and optional inductor 38. The active phase legs 22-26 in combination with the first charging switch 36 and electromechanical device 34 form three bi-directional buck/boost DC/DC converters. While this embodiment uses phase legs 22-26, any phase leg of a converter tied to the DC bus 8 may be used, including phase legs from additional DC/DC converters, traction inverters, or auxiliary inverters.

Using the phase legs 22-26, first charging switch 36, and electromechanical device 34 as DC/DC converters enables rapid charging of the energy storage device 4 without the significant addition of on board charger components, thus reducing costs and space required for the DC bus 8. Moreover, the electromechanical device 34 remaining connected to the converter assembly 6 during charging further reduces costs since contactors for the electromechanical device can be expensive. Additionally, full power capability is exerted through use of all three phase legs. In this embodiment, the electromechanical device 34 does not produce torque so there is no resulting slight movement. Since the current from the three DC/DC converters do not create a rotating field, there is no torque produced on the shaft during charging. This embodiment may require a connection to a neutral point and the electromechanical device 34 should have windings 35 in a star or wye connection.

Figure 4:
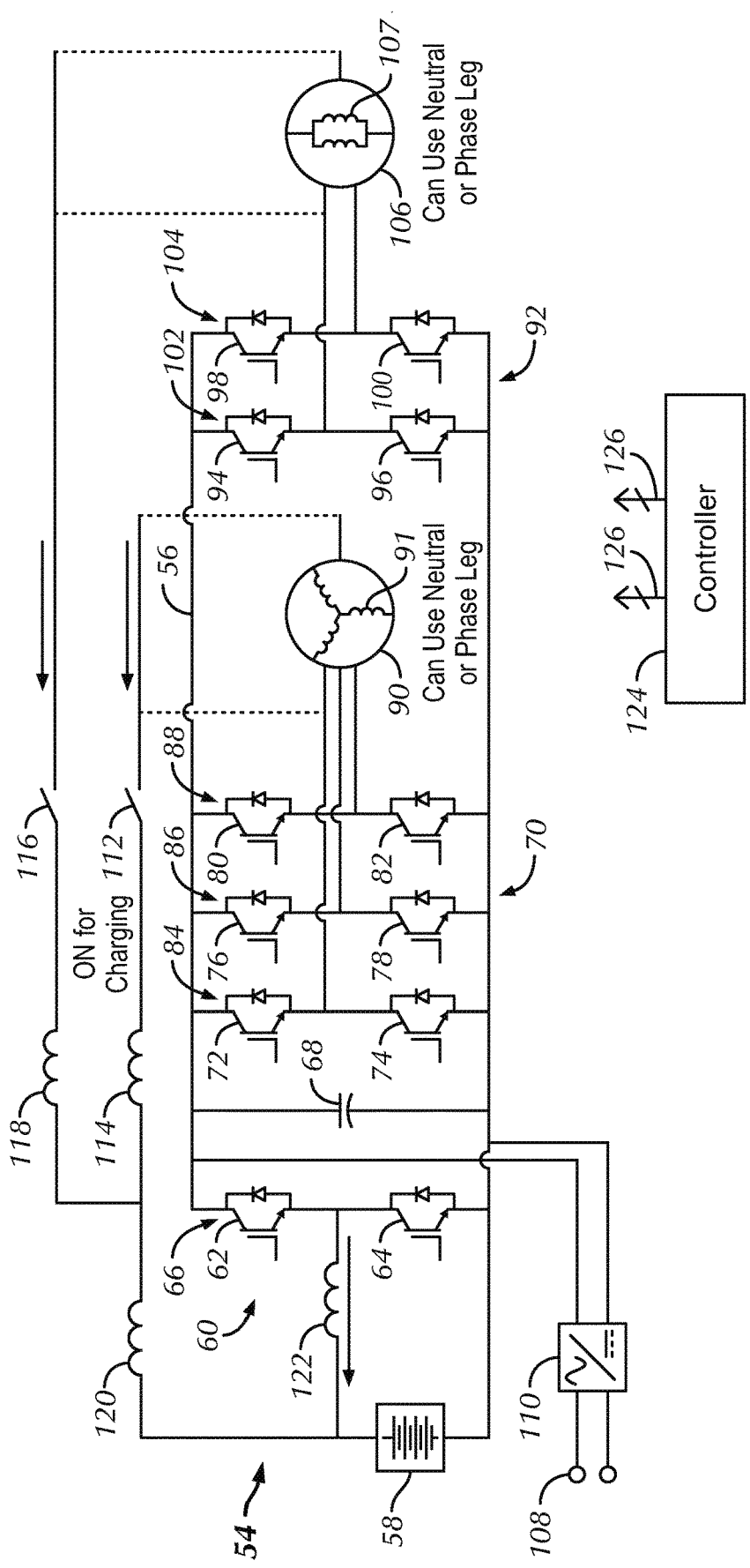
FIG. 4 is a schematic diagram of a traction system according to an embodiment of the present invention.

FIG. 4 is a schematic diagram of a traction system 54 with two electromechanical devices and two converter assemblies according to yet another embodiment of the present invention. In this embodiment, power capability is maximized by configuring all converters tied to a DC bus 56 as buck DC/DC converters. Traction system 54 includes an energy storage device 58 coupled to a first voltage converter assembly 60 via the DC bus 56. First voltage converter assembly 60 includes two half phase modules 62-64 that are paired to form a single phase leg 66. A DC link capacitor 68 is coupled to the DC bus 56 to provide a smoothing function and filter high frequency currents for DC bus 56. First voltage converter assembly 60 is coupled to a second voltage converter assembly 70 via the DC bus 56. Second voltage converter assembly 70 includes six half phase modules 72-82 that are paired to form three phase legs 84-88. A first electromechanical device 90 is coupled to second voltage converter assembly 70 via respective phases 84-88 of the second voltage converter assembly 70. The first electromechanical device 90 includes a plurality of windings 91. In one embodiment, the first electromechanical device 90 is a traction motor. Second voltage converter assembly 70 is coupled to a third voltage converter assembly 92 via the DC bus 56. Third voltage converter assembly 92 includes four half phase modules 94-100 that are paired to form two phase legs 102-104. A second electromechanical device 106 is coupled to third voltage converter assembly 92 via respective phases 102-104. The second electromechanical device includes a plurality of windings 107. The second electromechanical device 106 may be an alternator or second traction motor as nonlimiting examples. Traction system 54 includes a plug or receptacle 108 configured to mate with an AC voltage source (not shown). The plug 108 is coupled to a rectifier 110 to convert AC voltage or current from the AC voltage source (not shown) to DC voltage or current for the DC bus 56. A first charging switch 112 is coupled in series with an optional inductor 114 between the first electromechanical device 90 and energy storage device 58. A second charging switch 116 is coupled in series with an optional inductor 118 between the second electromechanical device 106 and the energy storage device 58. An additional optional inductor 120 can be included between the first and second charging switches 112 and 116 and the energy storage device 58.

Another inductor 122 is coupled between the first voltage converter assembly 60 and energy storage device 58. Traction system 54 also includes a controller 124 coupled to half phase modules 62-64, 72-82, and 94-100, and charging switches 112 and 116 via lines 126.

In a manner similar to the embodiment in FIG. 1, phase leg 66 in combination with inductor 122 forms a bi-directional buck/boost DC/DC converter. In a manner similar to the embodiment in FIG. 2, phase legs 102-104 in combination with the second charging switch 116 and second electromechanical device 106 form a pair of bi-directional buck/boost DC/DC converters. In a manner similar to the embodiment in FIG. 3, phase legs 84-88 in combination with first charging switch 112 and first electromechanical device 90 form three bi-directional buck/boost DC/DC converters.

The plurality of bi-directional buck/boost DC/DC converters may all be utilized to maximize power capability while enabling rapid charging of the energy storage device 58 without the significant addition of on board charger components, thus reducing costs and space required for DC bus 56. Moreover, the electromechanical devices 90 and 106 remain connected to the converter assembly during charging, further reducing costs since contactors for the electromechanical devices can be expensive. With this embodiment, the electromechanical devices should not produce torque so there is no resulting slight movement. A neutral is not required in this embodiment as well but may be included if preferred.

It is understood that the above-described embodiments are only illustrative of the application of the principles of the present invention. Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims

What is claimed is:

1. A traction system comprising: a DC bus; an energy storage device coupled to the DC bus; a voltage converter assembly coupled to the energy storage device, the voltage converter assembly comprising at least one phase leg; an electromechanical device coupled to the voltage converter assembly, the electromechanical device comprising at least one winding; a first switching device coupled between the electromechanical device and the energy storage device; a second switching device coupled to the DC bus between the voltage converter assembly and the energy storage device; and a controller configured to: control the first and second switching devices such that a charging path is defined by at least one phase leg of the voltage converter assembly and at least one winding of the electromechanical device in the order named; and control the voltage converter assembly such that a DC charging voltage derived from a voltage source is stepped down via the charging path to convert the DC charging voltage to a voltage suitable for charging the energy storage device.

2. The traction system of claim 1, further comprising an inductor coupled to the DC bus between a phase leg of the voltage converter assembly and the energy storage device.

3. The traction system of claim 2, wherein the controller is configured such that a phase leg and the inductor form a DC/DC converter.

4. The traction system of claim 1, wherein the controller is configured such that two phase legs and two windings of the electromechanical device form a pair of DC/DC converters.

5. The traction system of claim 1, wherein the controller is configured such that all phase legs and all windings of the electromechanical device form a plurality of DC/DC converters.

6. The traction system of claim 5, wherein the windings are configured in a wye connection.

7. The traction system of claim 1, wherein the electromechanical device is a traction motor.

8. The traction system of claim 1, further comprising a receptacle coupled to the DC bus between the energy storage device and the voltage converter assembly, the receptacle configured to mate with the voltage source.

9. The traction system of claim 1, wherein the voltage converter assembly is an inverter.

* * * * *